United States Patent
Yang et al.

(10) Patent No.: US 7,683,987 B2
(45) Date of Patent: Mar. 23, 2010

(54) THIN FILM TRANSISTOR ARRAY PANEL AND LIQUID CRYSTAL DISPLAY INCLUDING THE PANEL

(75) Inventors: Young-Chol Yang, Seongnam-si (KR); Chong-Chul Chai, Seoul (KR); Jeong-Ye Choi, Hwaseong-si (KR); Jin-Oh Kwag, Suwon-si (KR); Jin-Hong Kim, Yongin-si (KR); Sang-Il Kim, Yongin-si (KR); Mun-Pyo Hong, Seongnam-si (KR); Nam-Seok Roh, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1059 days.

(21) Appl. No.: 11/209,863

(22) Filed: Aug. 24, 2005

(65) Prior Publication Data

US 2006/0132682 A1    Jun. 22, 2006

(30) Foreign Application Priority Data

Dec. 17, 2004    (KR) ..................... 10-2004-0108173

(51) Int. Cl.
G02F 1/1335     (2006.01)
G02F 1/1343     (2006.01)

(52) U.S. Cl. ...................................... 349/114; 349/39
(58) Field of Classification Search .................. 349/114
See application file for complete search history.

(56) References Cited

U.S. PATENT DOCUMENTS

| | | | | |
|---|---|---|---|---|
| 6,654,076 B2 * | 11/2003 | Ha et al. | ..................... | 349/43 |
| 6,697,138 B2 * | 2/2004 | Ha et al. | ..................... | 349/114 |
| 6,753,934 B2 | 6/2004 | Park et al. | | |
| 6,917,405 B2 * | 7/2005 | Kim | ..................... | 349/114 |
| 2004/0075782 A1 | 4/2004 | Ha et al. | | |
| 2004/0085498 A1 | 5/2004 | Chang | ..................... | 349/114 |
| 2004/0124414 A1 | 7/2004 | Jang et al. | | |
| 2004/0150759 A1 | 8/2004 | Nishino et al. | | |
| 2006/0290848 A1 * | 12/2006 | Choi et al. | ..................... | 349/114 |
| 2007/0076148 A1 * | 4/2007 | Yang et al. | ..................... | 349/114 |

FOREIGN PATENT DOCUMENTS

| CN | 1402064 | 3/2003 |
|---|---|---|
| EP | 0 468 452 A2 | 1/1992 |
| EP | 0 562 120 A1 | 9/1993 |
| EP | 0 685 756 A2 | 12/1995 |

(Continued)

OTHER PUBLICATIONS

European Search Report for Application No. 05257743.4-2205; Dated: Mar. 31, 2006.

*Primary Examiner*—David Nelms
*Assistant Examiner*—W. Patty Chen
(74) *Attorney, Agent, or Firm*—Cantor Colburn LLP

(57) ABSTRACT

The present invention provides a TFT array panel having a transmissive region and a reflective region. A transmissive electrode is disposed in the transmissive region. The first reflective electrode connected to the transmissive electrode is disposed on the reflective region. The second reflective electrode separated from the transmissive electrode and the first reflective region is formed in the reflective region. A first conductor is connected to at least one of the transmissive electrode and the first reflective electrode. A second conductor is connected to the second reflective electrode. At least one of the transmissive electrode, the first reflective electrode and the first conductor overlaps at least one of the second reflective electrode and the second conductor.

16 Claims, 15 Drawing Sheets

FOREIGN PATENT DOCUMENTS

| | | |
|---|---|---|
| JP | 2003-057639 | 2/2003 |
| JP | 2003-222890 | 8/2003 |
| JP | 2004-126199 | 4/2004 |
| JP | 2004-157510 | 6/2004 |
| JP | 2004-212952 | 7/2004 |
| JP | 2004-219796 | 8/2004 |
| JP | 2004-240268 | 8/2004 |
| KR | 1020030057142 | 7/2003 |
| KR | 100408345 | 11/2003 |
| KR | 100417917 | 1/2004 |
| KR | 1020040012445 | 2/2004 |
| KR | 1020040018975 | 3/2004 |
| KR | 1020040024378 | 3/2004 |
| KR | 1020040062167 | 7/2004 |
| WO | WO 03/048847 | 6/2003 |
| WO | WO 2004/057411 | 7/2004 |

* cited by examiner

THIN FILM TRANSISTOR ARRAY PANEL AND LIQUID CRYSTAL DISPLAY INCLUDING THE PANEL

CROSS-REFERENCE TO RELATED APPLICATION

This application claims priority to and the benefit of Korean Patent Application No. 10-2004-0108173, filed on Dec. 17, 2004, in the Korean Intellectual Property Office, which are hereby incorporated by reference for all purposes as if fully set forth herein.

BACKGROUND OF THE INVENTION (a) Field of the Invention

The present invention relates to a thin film transistor (TFT) array panel and a liquid crystal display (LCD) having the TFT array panel, particularly to a transmissive-reflective LCD and a TFT array panel thereof.

(b) Description of the Related Art

LCDs are one of the most widely used flat panel displays. An LCD includes a liquid crystal (LC) layer interposed between two panels provided with field-generating electrodes. The LCD displays images by applying voltages to the field-generating electrodes to generate an electric field in the LC layer that determines orientations of LC molecules in the LC layer to adjust polarization of incident light. The light having adjusted polarization is either intercepted or allowed to pass by a polarizing film, thereby displaying images.

Depending on their light sources, LCDs are classified into a transmissive LCD and a reflective LCD. The light source of the transmissive LCD is a backlight. The light source of the reflective LCD is an external light. The reflective type LCD is usually applied to a small or middle size display device.

A transmissive-reflective LCD has been under development. The transmissive-reflective LCD uses both a backlight and an external light as the light sources depending on circumstances, and usually applied to small or middle size display devices. The trans-reflective LCD includes a transmissive region and a reflective region in a pixel. While light passes through an LC layer only once in the transmissive region, light passes through the LC layer twice in the reflective region. Accordingly, gamma curves of the transmissive region and the reflective region are not coincident, and images are displayed in different ways between the transmissive region and the reflective region.

To solve the problem, the LC layer may be formed to have different thicknesses (cell gaps) between the transmissive region and the reflective region. Alternatively, the trans-reflective LCD may be driven by two different driving voltages depending on whether the LCD is in a transmissive mode or a reflective mode.

However, when the two cell gap structure is applied, a thicker layer is required to be formed on the reflective region, thereby complicating the manufacturing process. Furthermore, since a high step is formed between the transmissive region and the reflective region, the LC molecules are aligned in a disorderly manner around the high step, thereby causing disclination in an image. Also, brightness reversion may occur in a high voltage range. On the other hand, when the two different driving voltages method is applied, gamma curves can not be coincident due to the inconsistency between critical voltages for transmissive brightness and reflective brightness.

SUMMARY OF THE INVENTION

The present invention provides an LCD having gamma curves for the reflective mode and the transmissive mode coinciding with each other while achieving a substantially uniform cell gap.

According to an aspect of the present invention, a transmissive electrode is formed on a substrate of a TFT array panel. The first reflective electrode is connected to the transmissive electrode and disposed on the reflective region. The second reflective electrode is separated from the transmissive electrode and the first reflective region. At least one of the transmissive electrode, the first reflective electrode and the first conductor connected to at least one of the transmissive electrode and the first reflective electrode overlaps at least one of the second reflective electrode and the second conductor connected to the second conductor.

According to another aspect of the present invention, an LCD has a plurality of pixels. Each of the pixels includes a transmissive LC capacitance having two terminals, a first reflective LC capacitance having two terminals respectively connected to the two terminals of the transmissive LC capacitance, and a second reflective LC capacitance having a terminal separated from all terminals of the transmissive LC capacitance and the first reflective LC capacitance. The voltage applied between the two terminals of the first reflective LC capacitance is different from the voltage applied between the two terminals of the second reflective LC capacitance.

According to another aspect of the present invention, a gate line is formed on a substrate of a TFT array panel. The first insulating layer is formed on the gate line, and a semiconductor layer is formed on the first insulating layer. A data line having at least a portion formed on the semiconductor layer is formed. A drain electrode having at least a portion formed on the semiconductor layer and separated from the data line is formed. The second insulating layer is formed on the data line and the drain electrode. The second insulating layer has a first contact hole exposing the drain electrode. A transmissive electrode is formed on the second insulating layer and connected to the drain electrode through the first contact hole. The first reflective electrode is connected to the transmissive electrode. The first auxiliary electrode is connected to the transmissive electrode. The second auxiliary electrode is formed to overlap at least one of the first auxiliary electrode and the drain electrode. The second reflective electrode is separated from the transmissive electrode and the first reflective electrode and connected to the second auxiliary electrode.

BRIEF DESCRIPTION OF THE DRAWINGS

The accompanying drawings are included to provide further understanding of the invention and are incorporated in and constitute a part of this specification.

DETAILED DESCRIPTION OF THE PREFERRED EMBODIMENTS

Figure 1:
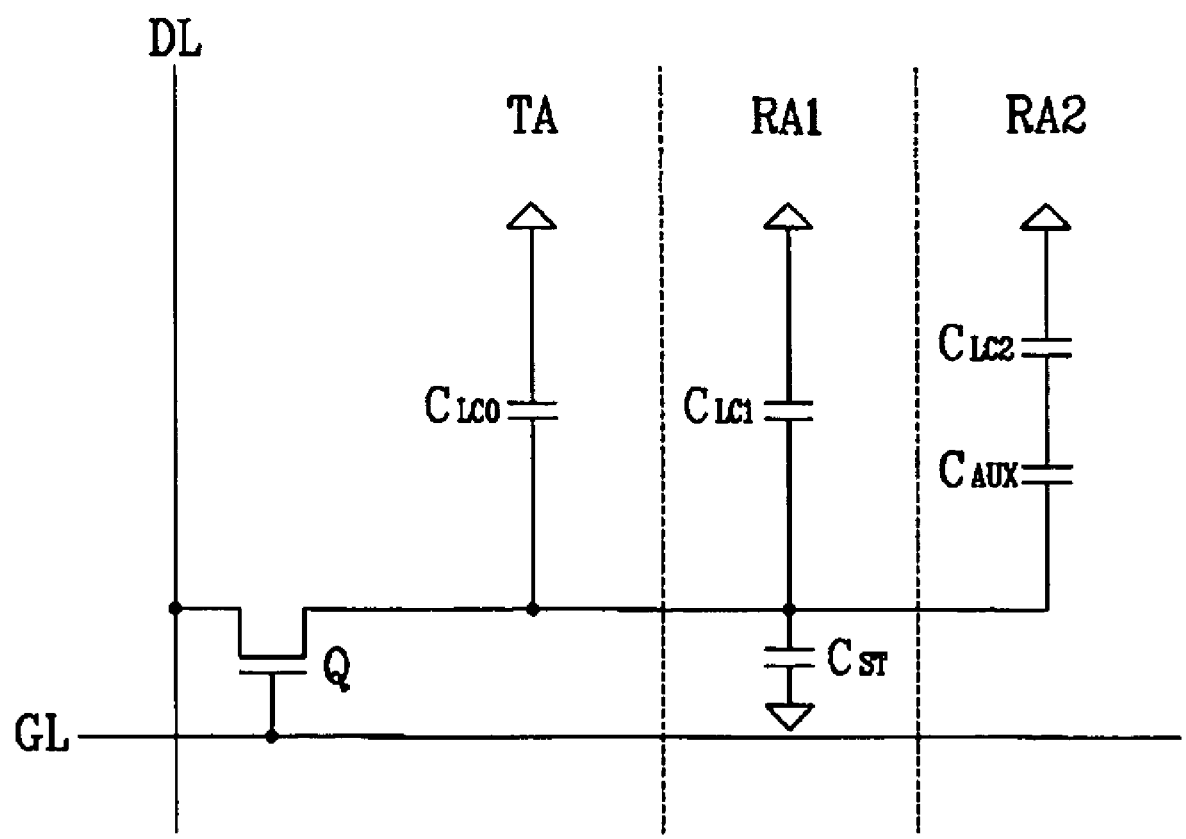
FIG. 1 is an equivalent circuit diagram of an LCD according to an embodiment of the present invention.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 2:
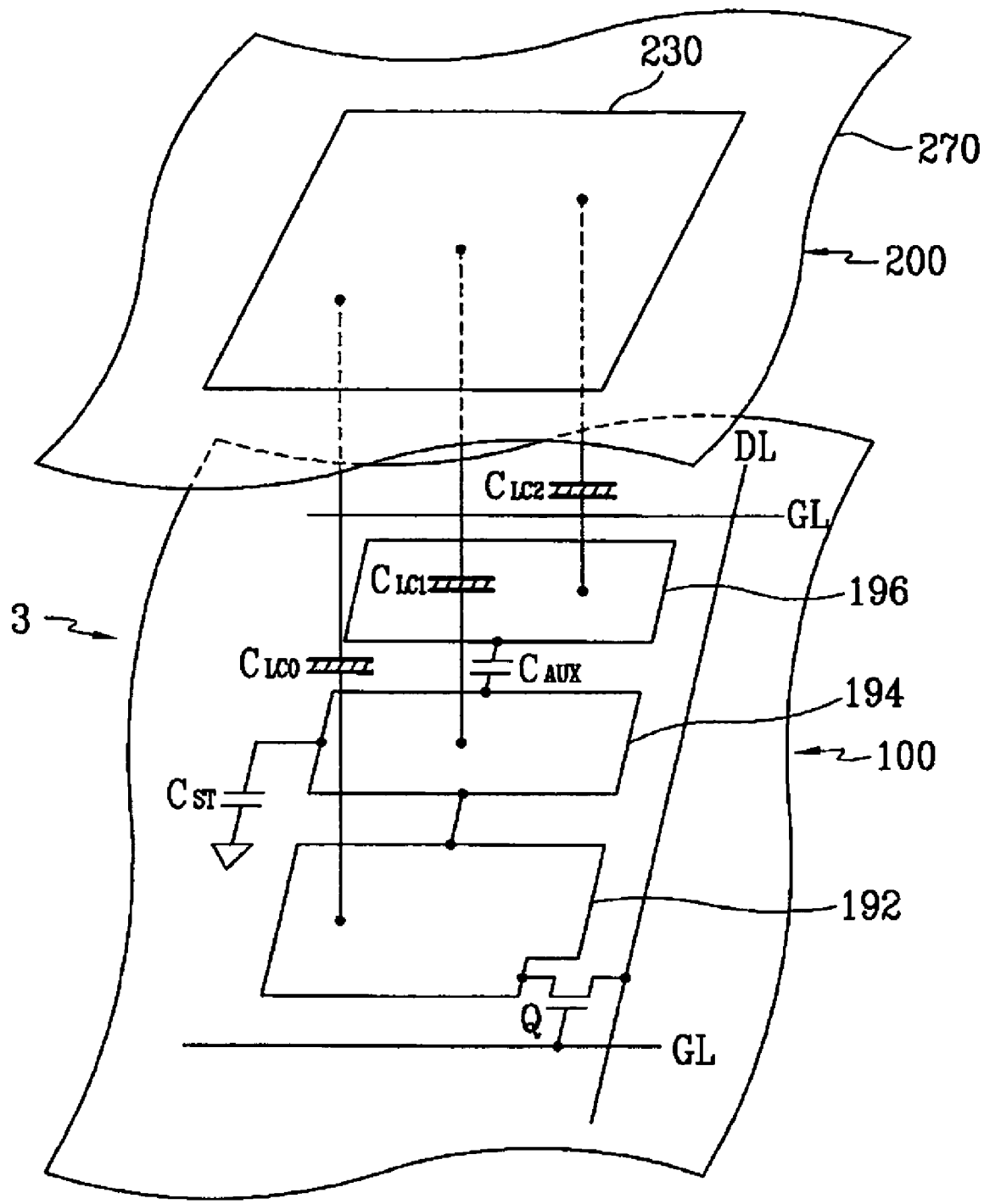
FIG. 2 is a conceptual diagram of an LCD according to an embodiment of the present invention.

Referring to FIGS. 1 and 2, an LCD according to an embodiment of the present application has a TFT array panel 100, a common electrode panel 200 facing the TFT array panel 100, and a liquid crystal layer 3 interposed between the two panels 100 and 200 and having LC molecules aligned in parallel or perpendicular to the two panels 100 and 200. The display signal lines GL and DL are provided on the lower panel 100 and include a plurality of gate lines GL for transmitting gate signals (also referred to as "scanning signals"), and a plurality of data lines DL for transmitting data signals. The gate lines GL extend substantially in a row direction and substantially parallel to each other, while the data lines DL extend substantially in a column direction and substantially parallel to each other.

Each pixel includes a switching element Q connected to the gate lines GL and the data lines DL, a transmissive LC capacitance $C_{LC0}$, the first reflective LC capacitance $C_{LC1}$, an auxiliary capacitance $C_{AUX}$, a storage capacitance $C_{ST}$, and the second reflective LC capacitance $C_{LC2}$ connected to the auxiliary capacitance $C_{AUX}$. The storage capacitance $C_{ST}$ may be omitted. The switching element Q, such as a TFT, is provided on the lower panel 100 and has three terminals: a control terminal connected to one of the gate lines GL; an input terminal connected to one of the data lines DL; and an output terminal connected to the transmissive LC capacitance $C_{LC0}$, the first reflective LC capacitance $C_{LC1}$, the auxiliary capacitance $C_{AUX}$, and the storage capacitance $C_{ST}$.

Referring to FIG. 2, the transmissive LC capacitance $C_{LC0}$ is formed between a transmissive electrode 192 provided on the lower panel 100 and a common electrode 270 provided on the upper panel 200. The transmissive electrode 192 is connected to the switching element Q, and the common electrode 270 is supplied with a common voltage $V_{com}$, and covers the entire surface of the upper panel 200. Alternatively, the common electrode 270 may be provided on the lower panel 100. In this case, at least one of the transmissive electrode 192 and the common electrode 270 may be shaped as a bar or a stripe.

The first reflective LC capacitance $C_{LC1}$ is formed between a first reflective electrode 194 provided on the lower panel 100 and the common electrode 270. The first reflective electrode 194 is connected to the switching element Q via the transmissive electrode 192. The second reflective LC capacitance $C_{LC2}$ is formed between the second reflective electrode 196 provided on the lower panel 100 and the common electrode 270. The second reflective electrode 196 is connected to the auxiliary capacitance $C_{AUX}$ but is electrically separated from the transmissive electrode 192 and the first reflective electrode 194.

The auxiliary capacitance $C_{AUX}$ is formed between the second reflective electrode 196 or a conductor connected to the second reflective electrode 196 and one of the transmissive electrode 192, the first reflective electrode 194, and a conductor connected thereto. The auxiliary capacitance $C_{AUX}$ divides the voltage applied between the common electrode 270 and the first reflective electrode 194 or the transmissive electrode 192 along with the second reflective LC capacitance $C_{LC2}$. Accordingly, the voltage applied to the second reflective LC capacitance $C_{LC2}$ is smaller than the voltage applied to the first reflective LC capacitance $C_{LC1}$.

In a transmissive region TA defined by the transmissive electrode 192, light from a backlight unit (not illustrated) disposed under the lower panel 100 passes through the liquid crystal layer 3 to display an image. In the first and second reflective region RA1 and RA2 defined by the first and second reflective electrodes 194 and 196, external light such as sun light incidents through the upper panel 200 and passes through the liquid crystal layer 3 to reach the first and second reflective electrodes 194 and 196. Then, the external light is reflected by the first and second reflective electrodes 194 and 196 and passes through the liquid crystal layer 3 again.

The storage capacitance $C_{ST}$ is an auxiliary capacitance for the LC capacitances $C_{LC0}$, $C_{LC1}$ and $C_{LC2}$. When the transmissive electrode 192 or the first reflective electrode 194 and a separate signal line (not shown), which is provided on the lower panel 100, are overlapped with each other with an insulator formed therebetween, the overlap portion becomes the storage capacitance $C_{ST}$. Alternatively, the storage capacitance $C_{ST}$ may be formed by overlapping the transmissive electrode 192 or the first reflective electrode 194 with a previous gate line with an insulator formed therebetween.

Figure 3:
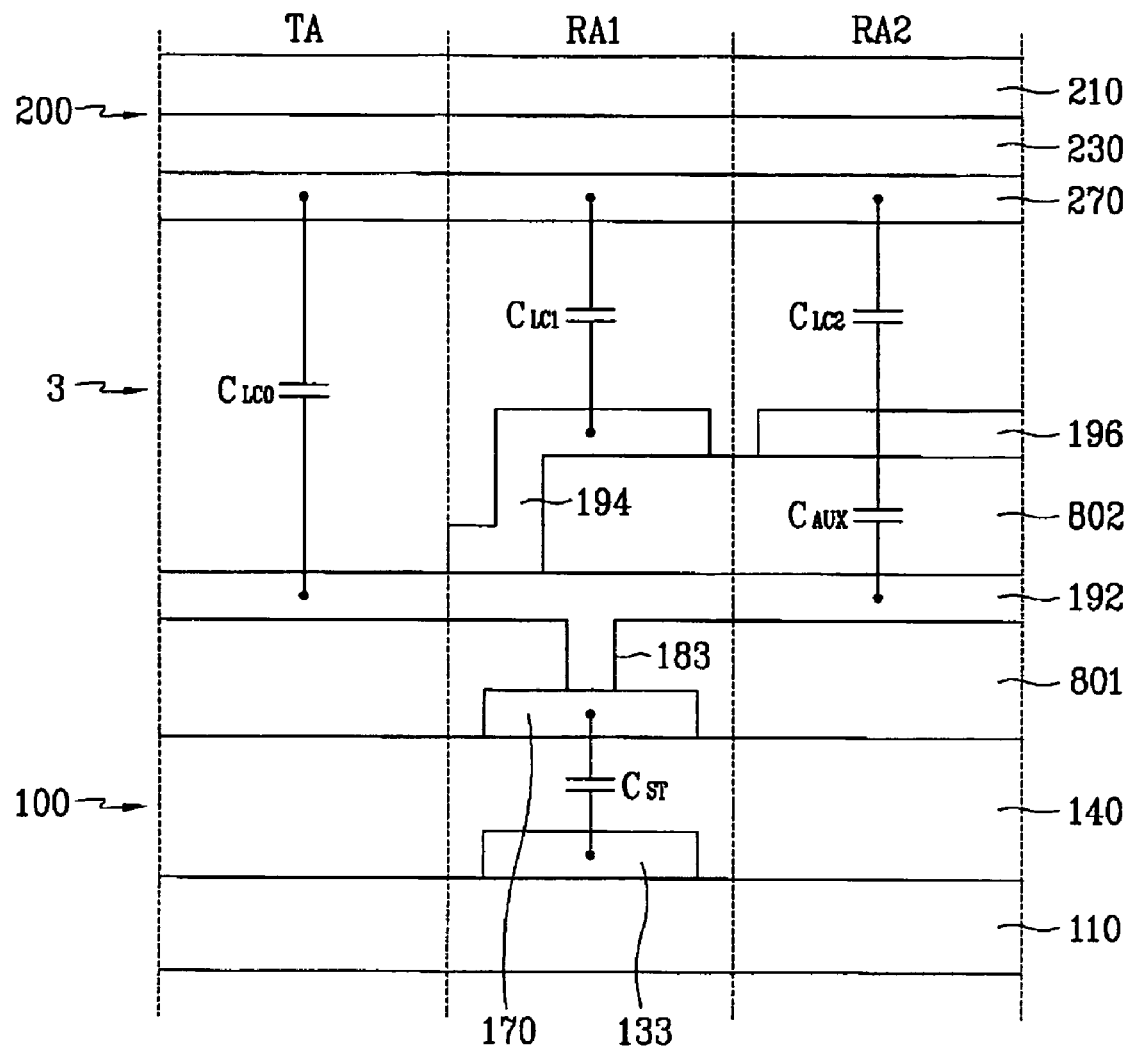
FIG. 3 is a sectional view of an LCD according to an embodiment of the present invention.
Figure 4:
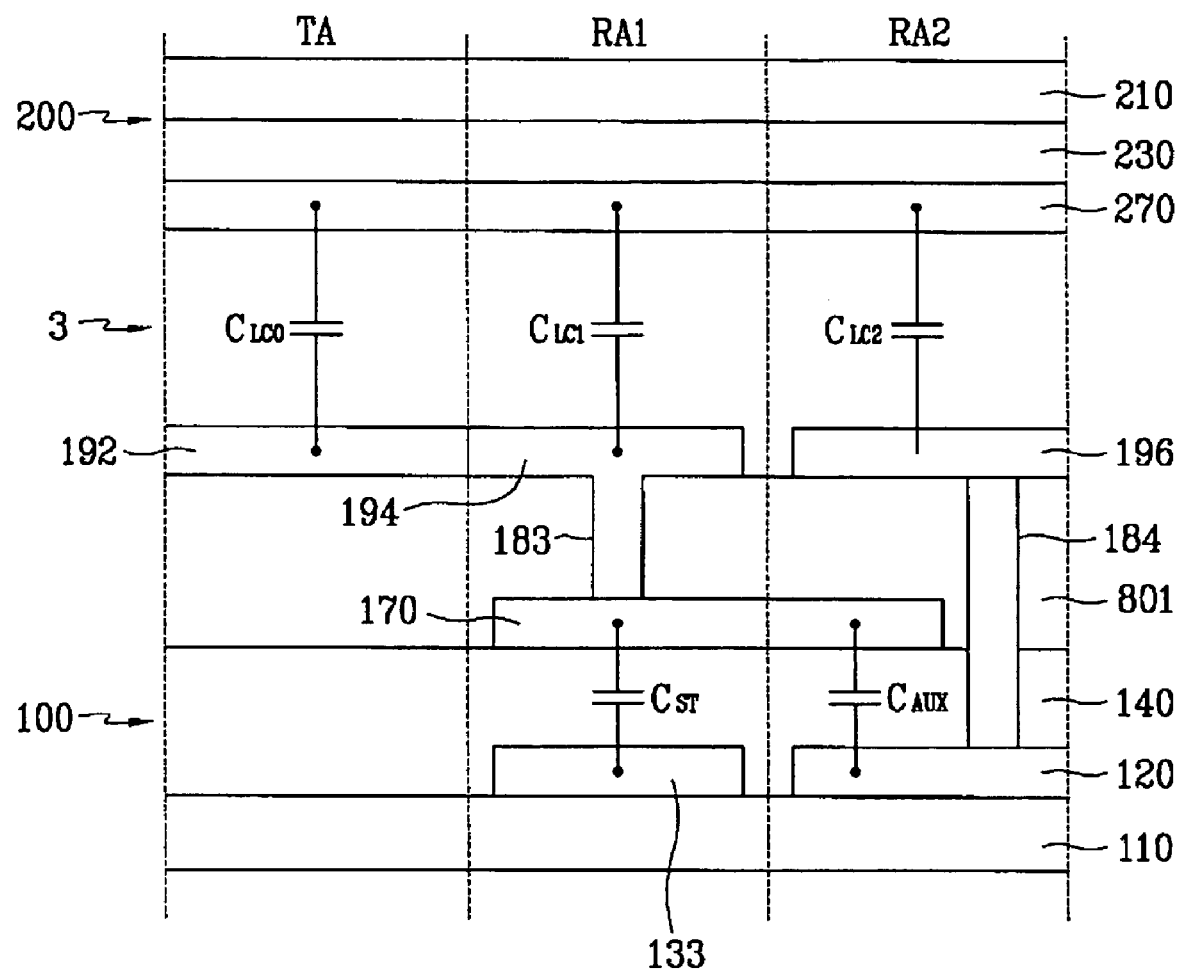
FIGS. 4 and 5 are sectional views of LCDs according to embodiments of the present invention.
Figure 5:
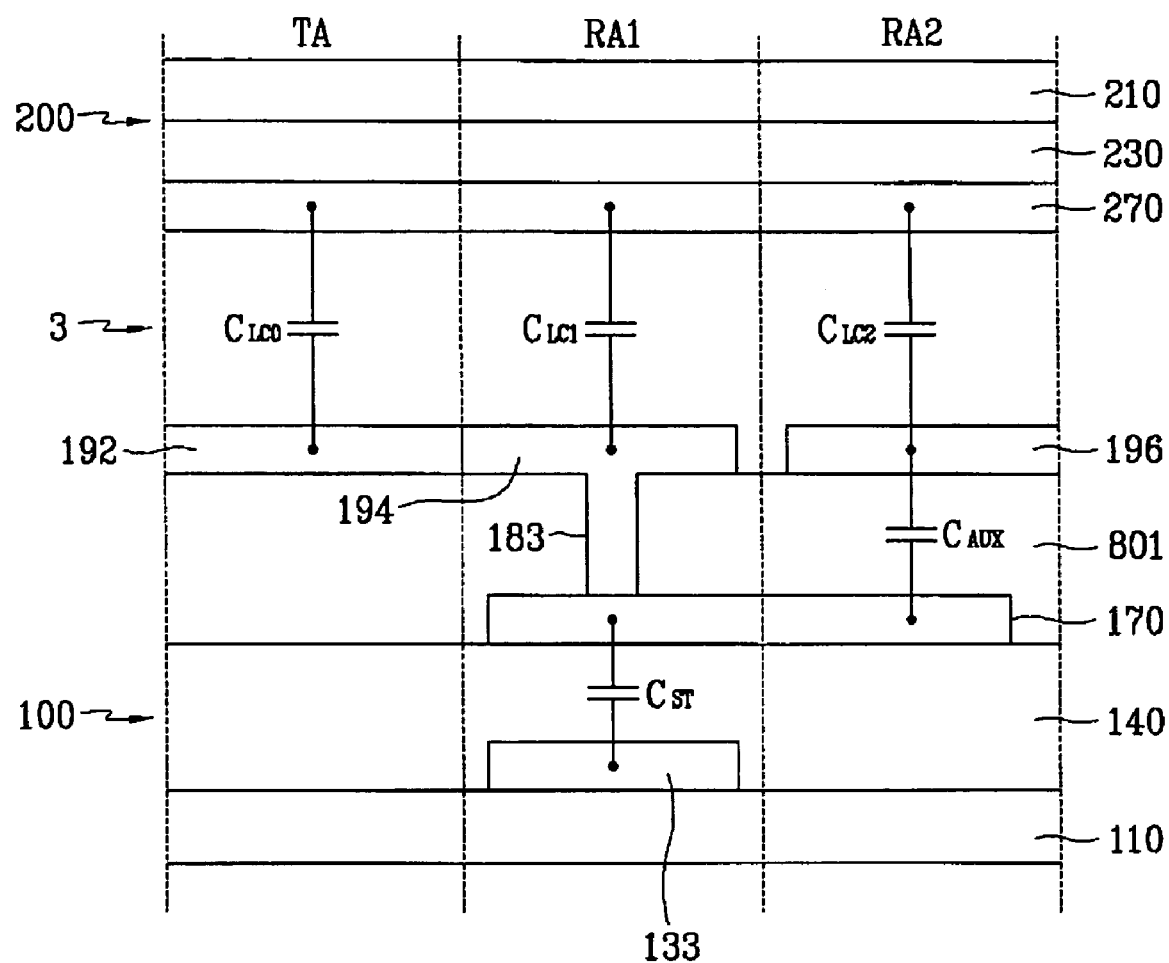

FIGS. 3 to 5 depict sectional views of LCDs according to embodiments of the present invention. Referring to FIG. 3, a lower panel 100 has an insulating substrate 110, a storage electrode 133 formed on the insulating substrate 110, a gate insulating layer 140 covering the storage electrode 133, and an output electrode 170 of a switching element Q formed on the gate insulating layer 140. A storage capacitance $C_{ST}$ is formed between the storage electrode 133 and the output electrode 170, which are overlapping each other. The first insulating layer 801 is formed on the output electrode 170 and has a contact hole 183.

A transmissive electrode 192 is formed on the first insulating layer 801 and is physically and electrically connected to the output electrode 170 through the contact hole 183. The second insulating layer 802 is formed on the transmissive electrode 192 and is disposed on the first and second reflective regions RA1 and RA2. The second insulation layer may have an embossed surface. The first and second reflective electrodes 194 and 196 are formed on the second insulating layer 802. The first reflective electrode 194 is connected to the transmissive electrode 192 and is separated from the second reflective electrode 196. An auxiliary capacitance $C_{AUX}$ is formed between the transmissive electrode 192 and the second reflective electrode 196. The second insulating layer 802 is interposed between the transmissive electrode 192 and the second reflective electrode 196.

An upper panel 200 has an insulating substrate 210, a color filter 230 formed on the insulating substrate 210, and a common electrode 270 formed on the color filter 230. The transmissive LC capacitance $C_{LC0}$ is formed between the common electrode 270 and the transmissive electrode 192. The first and second reflective LC capacitances $C_{LC1}$ and $C_{LC2}$ are respectively formed between the first and second reflective electrodes 194 and 196 and the common electrode 270. A step is formed between the transmissive region TA and the first and second reflective regions RA1 and RA2 mainly due to the second insulating layer 802, and the step is at least as tall as the thickness of the second insulating layer 802.

Referring to FIG. 4, a lower panel 100 has an insulating substrate 110, a storage electrode 133 and an auxiliary electrode 120 formed on the insulating substrate 110, a gate insulating layer 140 covering the storage electrode 133 and the auxiliary electrode 120. An output electrode 170 of a switching element Q is formed on the gate insulating layer 140. A storage capacitance $C_{ST}$ is formed between the storage electrode 133 and the output electrode 170, which are overlapping each other, and an auxiliary capacitance $C_{AUX}$ is formed between the auxiliary electrode 120 and the output electrode 170, which are overlapping each other. The gate insulating layer 140 is interposed between the storage electrode 133 and auxiliary electrode 120 and the output electrode 170. An insulating layer 801 is formed on the output electrode 170. The insulating layer 801 may have an embossed surface. A contact holes 183 is formed via the insulating layer 801. A contact hole 184 is formed via the gate insulating layer 140 and the insulating layer 801.

On the insulating layer 801, a transmissive electrode 192 and the first and second reflective electrodes 194 and 196 are formed. The first reflective electrode 194 is physically and electrically connected to the output electrode 170 through the contact hole 183 and the first reflective electrode 194 is also connected to the transmissive electrode 192. The second reflective electrode 196 is physically and electrically connected to the auxiliary electrode 120 through the contact hole 184 but is separated from the first reflective electrode 194.

An upper panel 200 has an insulating substrate 210, a color filter 230 formed on the insulating layer 210 and a common electrode 270 formed on the color filter 230. The transmissive LC capacitance $C_{LC0}$ is formed between the common electrode 270 and the transmissive electrode 192. The first and second reflective LC capacitances $C_{LC1}$ and $C_{LC2}$ are respectively formed between the first and second reflective electrodes 194 and 196 and the common electrode 270. It is one of different features from the LCD of FIG. 3 that cell gap is substantially uniform throughout the transmissive region TA and the first and second reflective regions RA1 and RA2.

Referring to FIG. 5, a lower panel 100 has an insulating substrate 110, a storage electrode 133 formed on the insulating substrate 110, and a gate insulating layer 140 covering the storage electrode 133. An output electrode 170 of a switching element Q is formed on the gate insulating layer 140. A storage capacitance $C_{ST}$ is formed between the storage electrode 133 and the output electrode 170, which are overlapping each other. An insulating layer 801 is formed on the output electrode 170 and has a contact hole 183. The insulating layer may have an embossed surface. On the insulating layer 801, a transmissive electrode 192 and the first and second reflective electrodes 194 and 196 are formed. The first reflective electrode 194 is physically and electrically connected to the output electrode 170 through the contact hole 183. The first reflective electrode 192 is also connected to the transmissive electrode 192 but is separated from the second reflective electrode 196. An auxiliary capacitance $C_{AUX}$ is formed between the second reflective electrode 196 and the output electrode 170. The insulating layer 801 is interposed between the second reflective electrode 196, which are overlapping each other.

An upper panel 200 has an insulating substrate 210, a color filter 230 formed on the insulating substrate 210 and a common electrode 270 formed on the color filter 230. The transmissive LC capacitance $C_{LC0}$ is formed between the common electrode 270 and the transmissive electrode 192. The first and second reflective LC capacitances $C_{LC1}$ and $C_{LC2}$ are respectively formed between the first and second reflective electrodes 194 and 196 and the common electrode 270. The cell gap is substantially uniform throughout the transmissive region TA and the first and second reflective regions RA1 and RA2.

Methods of making a voltage-reflective curve coincident with a voltage-transmissive curve will be described with reference to FIGS. 6A to 6F, which illustrate a voltage-transmissive curve and voltage-reflective curves according to area ratios and voltage ratios of the first and second reflective electrodes.

When a data voltage corresponding to an image signal is applied to the transmissive electrode 192 and the first reflective electrode through the switching element Q, a voltage difference V (e.g. a pixel voltage) between the data voltage and the common voltage $V_{com}$ is formed between the two terminals of the transmissive LC capacitance $C_{LC0}$ and the first reflective LC capacitance $C_{LC1}$. However, a voltage difference V2 smaller than the pixel voltage V is formed between the two terminals of the second reflective LC capacitance $C_{LC2}$ due to the auxiliary capacitance $C_{AUX}$ and is described by following Equation 1.

$$V2 = \frac{C_{AUX}}{(C_{AUX} + C_{LC2})} V \qquad \text{[Equation 1]}$$

The voltage-transmissive curves VT shown in FIGS. 6A to 6F represent variation of brightness in the transmissive region TA with respect to variation of the pixel voltage V. The first voltage-reflective curves VR1 represent variation of brightness in the reflective region RA with respect to variation of the pixel voltage V. The voltage-transmissive curves VT and the first voltage-reflective curves VR1 are obtained based on measured data from test panels. The test panels are manufactured to have the transmissive electrode 192 and the first reflective electrode 194 but does not have the second reflective electrode 196. The second voltage-reflective curves VR2 are obtained based on calculated data by Equation 1 and the first voltage-reflective curve VR1. The third voltage-reflective curves VR3 are obtained by composing the first voltage-reflective curves VR1 and second voltage-reflective curve VR2. The resulting curves in FIGS. 6A to 6F are differentiated by area ratios of the first reflective region RA1 and the reflective region RA2.

When the first voltage-reflective curves VR1, second voltage-reflective curves VR2, and third voltage-reflective curves VR3 are respectively represented by functions R1(V), R2(V), and R3(V), following Equation 2 is provided.

$$R3(v) = (1 - AR) \cdot RA1(V) + AR \cdot RA2(V)$$ [Equation 2]
$$= (1 - AR) \cdot RA1(V) + AR \cdot RA1(kV)$$

Here, $$AR = \frac{A2}{(A1 + A2)}, \quad k = \frac{C_{AUX}}{(C_{AUX} + C_{LC2})}$$

and A1 and A2 respectively represent areas of the first and second reflective regions RA1 and RA2. That is, AR represent an area ratio between the whole reflective region and the second reflective region RA2, k represents a voltage ratio between the pixel voltage V and the voltage V2 applied to the second reflective LC capacitance $C_{LC2}$.

Figure 6A:
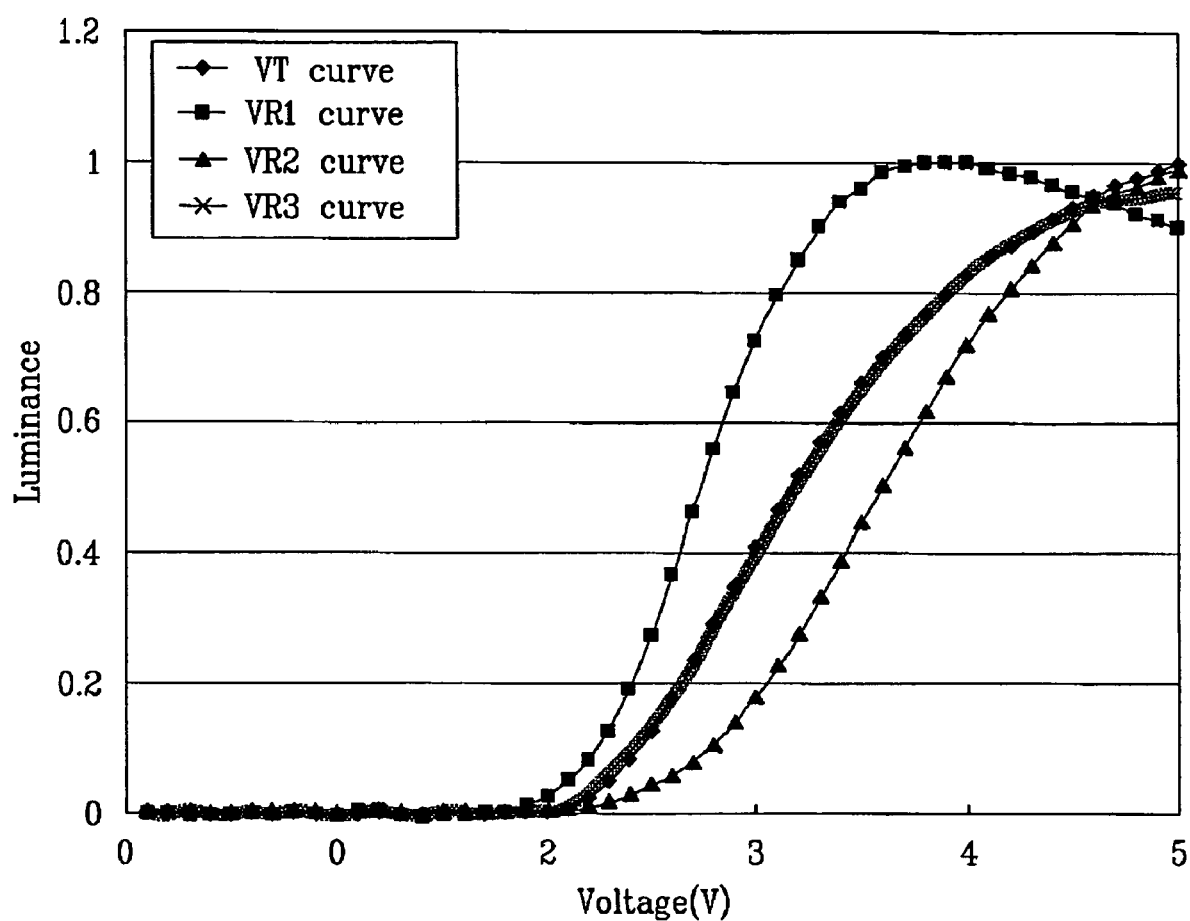
FIGS. 6A to 6F are graphs illustrating a voltage-transmissive curve and voltage-reflective curves according to area ratios and voltage ratios of the first and second reflective electrodes.

A simulation was performed by varying the area ratio AR and the voltage ratio k to achieve a third voltage-reflective curve VR3, which is most similar to the voltage-transmissive curve VT. Initially, while the area ratio AR was fixed at a certain value and the voltage ratio was varied, the shape of the third voltage-reflective curve VR3 and the voltage-transmissive curve VT was checked. Then, the area ratio was changed to a different value and the same processes were repeated. Simulations were performed with respect to the area ratios AR of 0.4, 0.5, 0.6, and 0.7. The best third voltage-reflective curve VR3 is provided when the area ratio AR is 0.6 and the voltage ratio k is 0.82. FIG. 6A illustrates the best third voltage-reflective curve VR3, which is almost coincident with the voltage-transmissive curve VT.

Figure 6B:
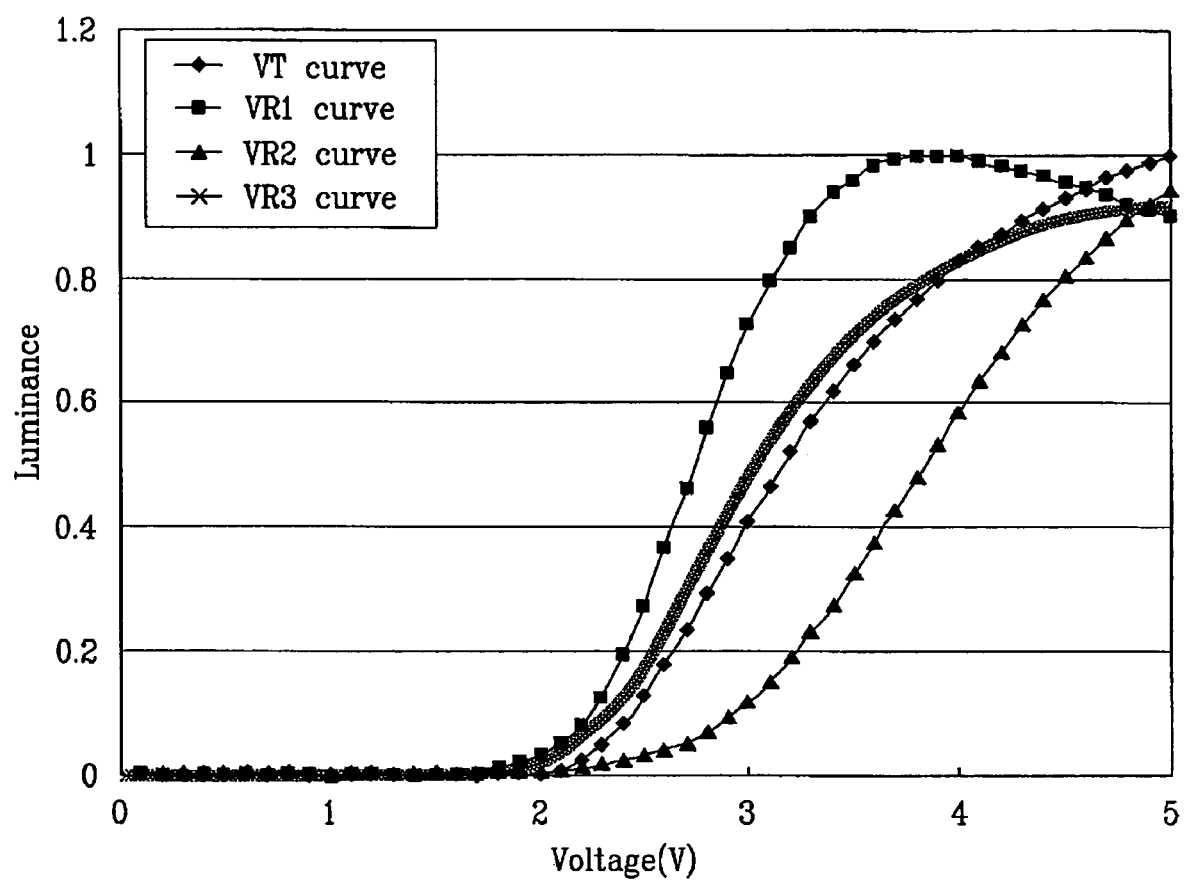
Figure 6C:
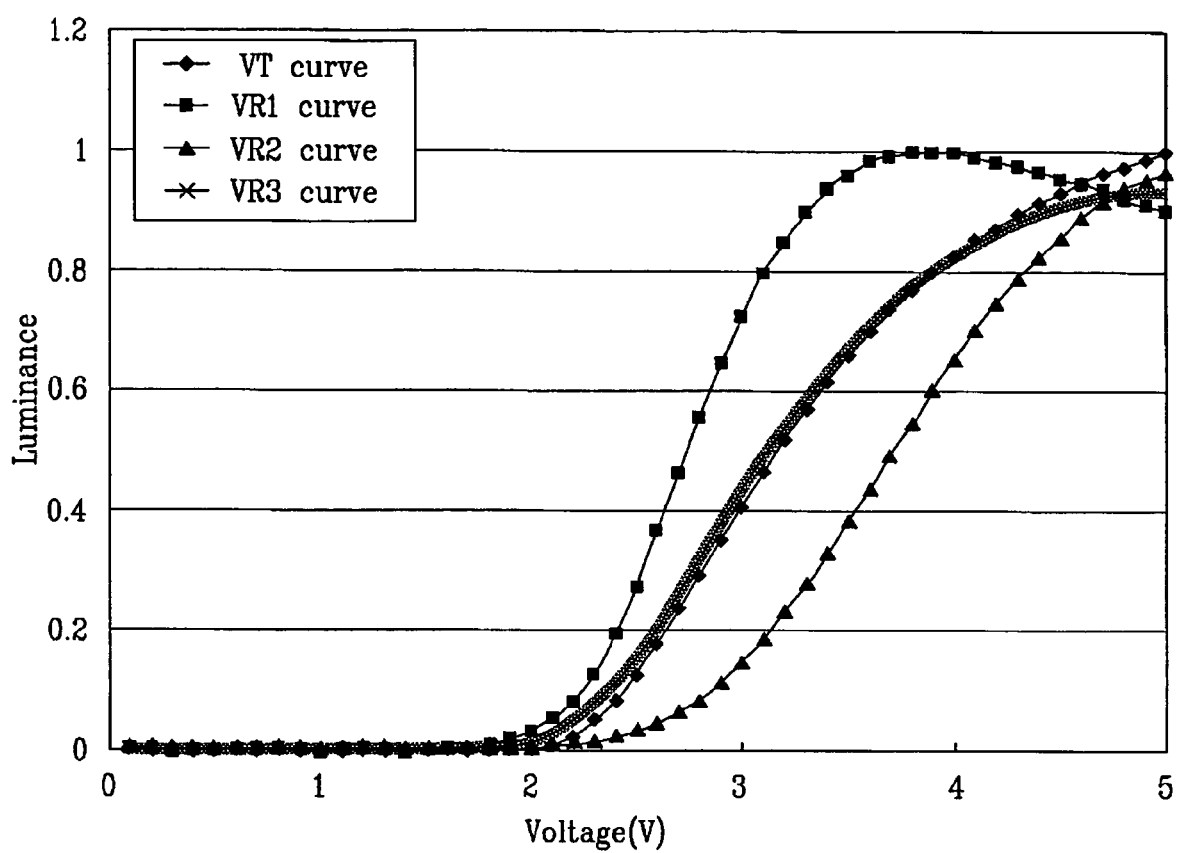
Figure 6D:
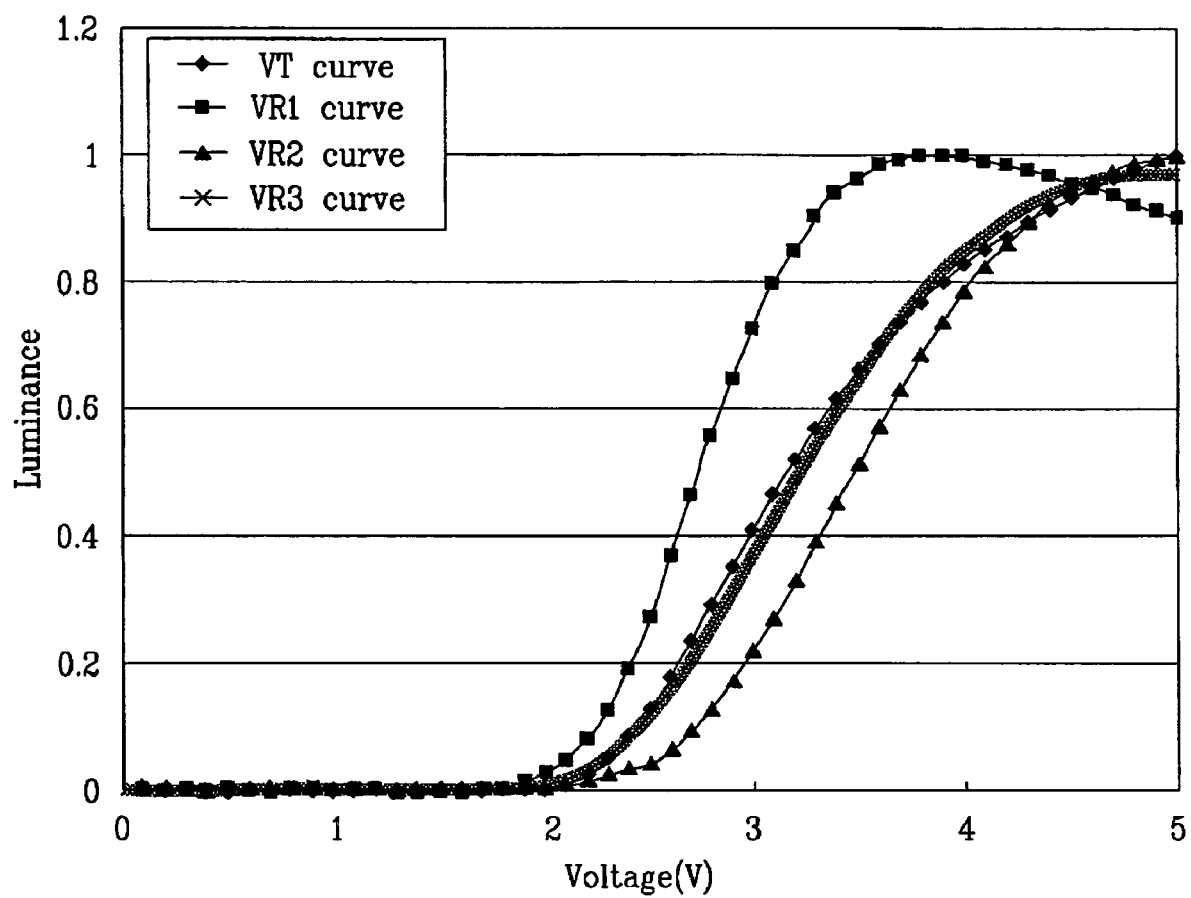

FIGS. 6B, 6C, and 6D respectively illustrate the third voltage-reflective curves VR3 with respect to the area ratios AR 0.4, 0.5, and 0.7. The voltage ratio k of each case is adjusted to have the third voltage-reflective curve VR3 approach to the voltage-transmissive curve VT. The most appropriate voltage ratios k for the respective area ratios AR 0.4, 0.5, and 0.7 are 0.78, 0.80, and 0.84. The third voltage-reflective curves VR3 of FIGS. 6B, 6C, and 6D deviate a little from the voltage-transmissive curve VT but are still satisfactory.

Figure 6E:
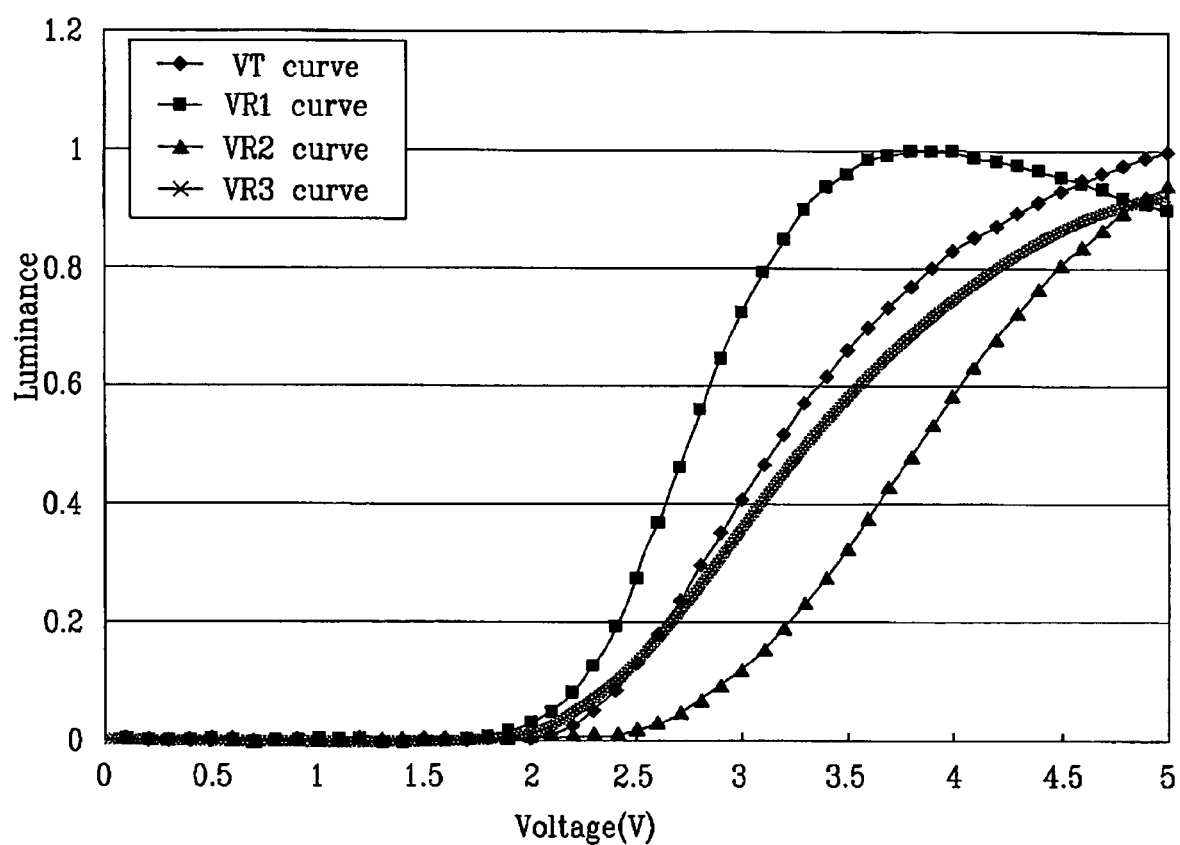
Figure 6F:
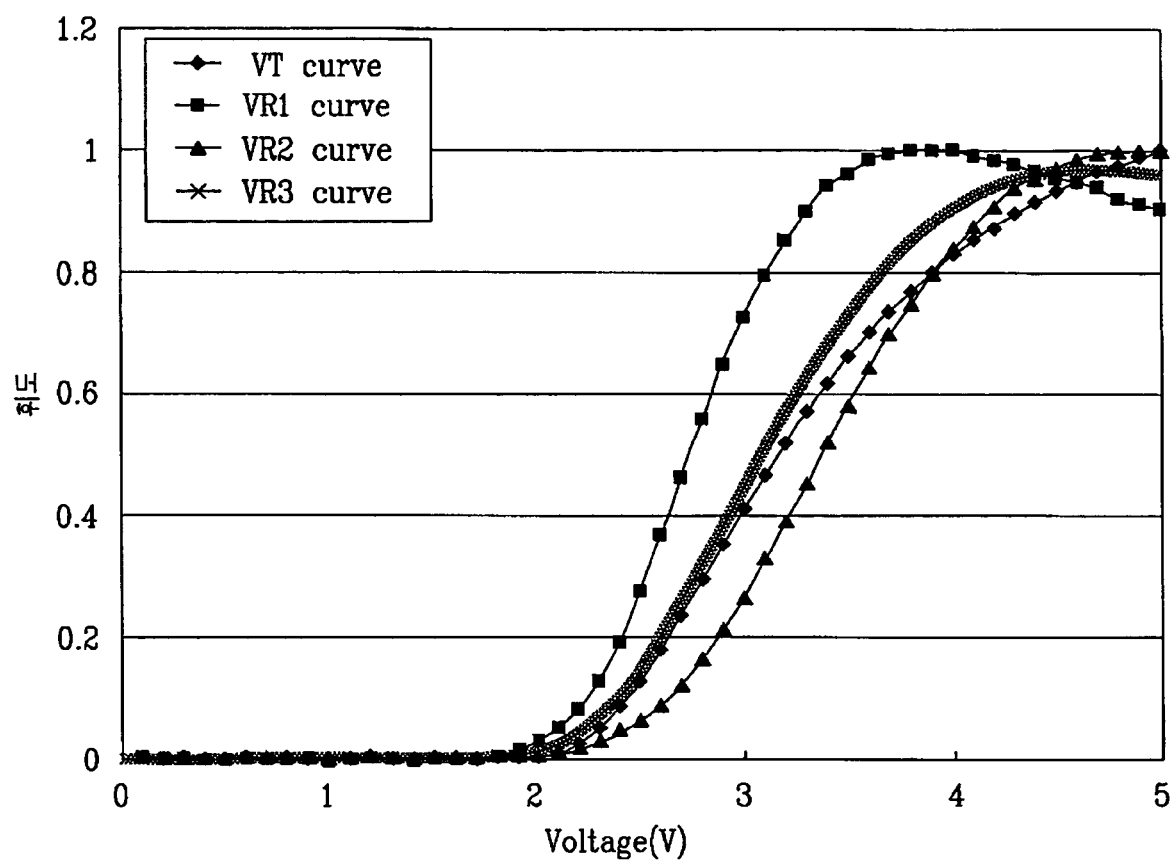

FIGS. 6E and 6F illustrate the third voltage-reflective curves VR3 provided when the area ratio AR is 0.6 and the voltage ratios k are respectively 0.78 and 0.86. As shown therein, inconsistency between the third voltage-reflective curves VR3 and the voltage-transmissive curve VT is increased.

Referring to the result of the simulation, when the area ratio AR has a value ranging from 0.4 to 0.7 and the voltage ratio k has a value ranging from 0.78 to 0.86, the third voltage-reflective curve VR3 close to the voltage-transmissive curve VT is provided.

A value of the auxiliary capacitance $C_{AUX}$ for making the voltage ratio k to be 0.82 is calculated by the following Equation 3.

$$0.82 = \frac{C_{AUX}}{(C_{AUX} + C_{LC2})}$$ [Equation 3]
$$C_{AUX} = 4.56 * C_{LC2}$$

That is, the auxiliary capacitance $C_{AUX}$ is required to be 4.56 times the capacitance of the second reflective LC capacitance $C_{LC2}$.

A capacitance C of a flat capacitor is calculated by the following Equation 4.

$$C = \varepsilon \frac{A}{d},$$ [Equation 4]

where A is the electrode area, d is a distance between the two electrodes, and ε is a dielectric constant.

Since silicon nitride (SiNx), which is a commonly used insulating material, has a dielectric constant $\varepsilon_{SiNx}$ similar with that $\varepsilon_{LC}$ of a liquid crystal layer, when the electrodes of the second reflective LC capacitance $C_{LC2}$ and the auxiliary capacitance $C_{AUX}$ have the same area, the thickness $d_{SiNx}$ of the insulating layer which works as a dielectric of the auxiliary capacitance $C_{AUX}$ is calculated by the following Equation 5.

$$\frac{\varepsilon_{SiNx}}{d_{SiNx}} = 4.56 \frac{\varepsilon_{LC}}{d_{LC}}$$ [Equation 5]
$$d_{SiNx} = \frac{1}{4.56} \frac{\varepsilon_{SiNx}}{\varepsilon_{LC}} d_{LC}$$
$$d_{SiNx} = \frac{1}{4.56} d_{LC}$$

Here, $d_{LC}$ represents a thickness of the liquid crystal layer of the second reflective LC capacitance $C_{LC2}$. When the thickness $d_{LC}$ of the liquid crystal layer is 3 μm, the thickness of the insulating layer is 0.66 μm. Such thickness of the insulating layer may be unreasonable in a view from manufacturing process. Accordingly, when the insulating layer is required to thinner, the electrode area of the auxiliary capacitance $C_{AUX}$ may be reduced to provide an auxiliary capacitance appropriate to Equation 3. For example, as shown in FIG. 4, a required auxiliary capacitance $C_{AUX}$ may be provided by adjusting the overlapping area between the output electrode 170 and the auxiliary electrode 120.

Figure 7:
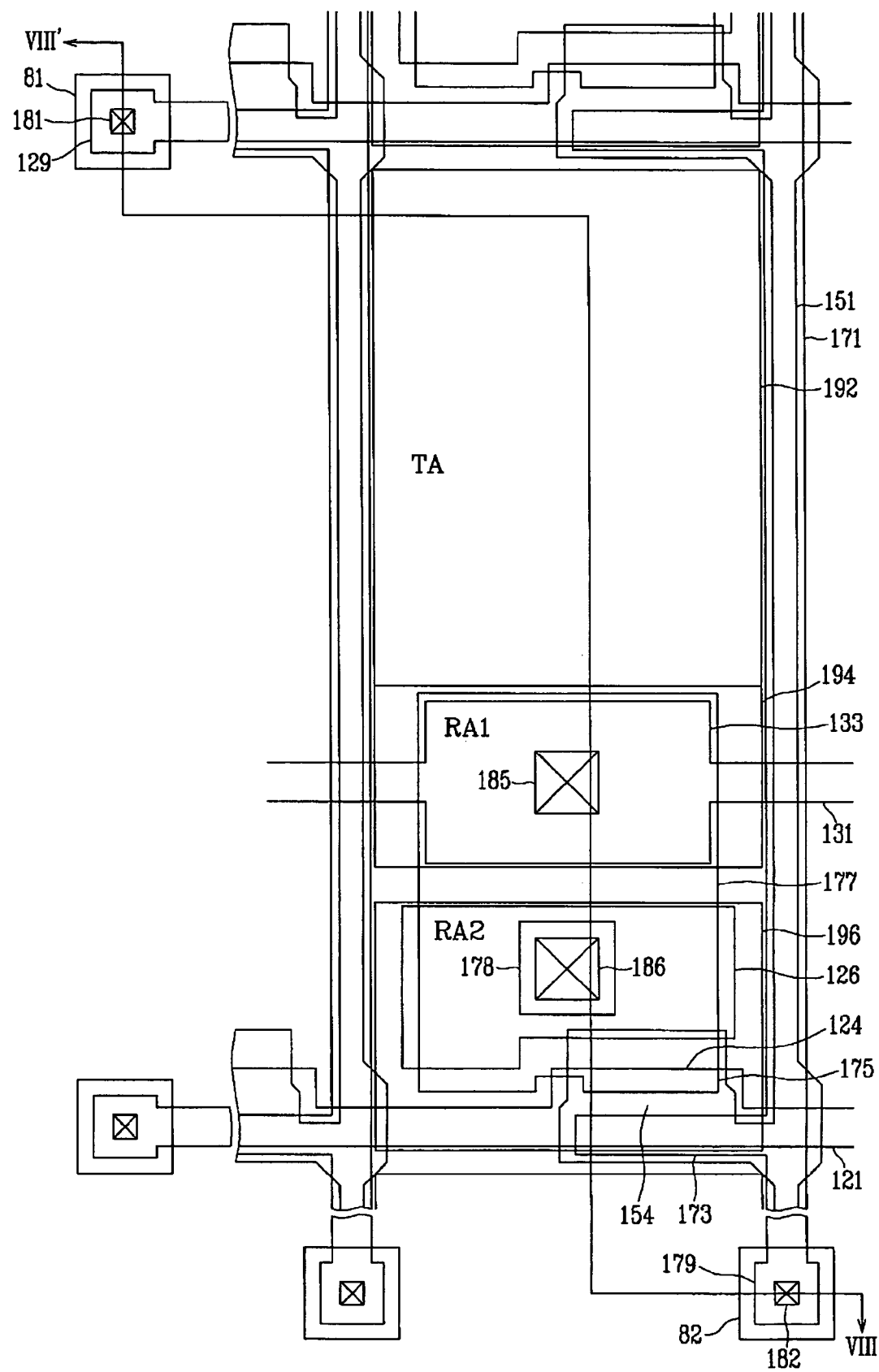
FIG. 7 is a layout view of the LCD illustrated in FIG. 4.
Figure 8:
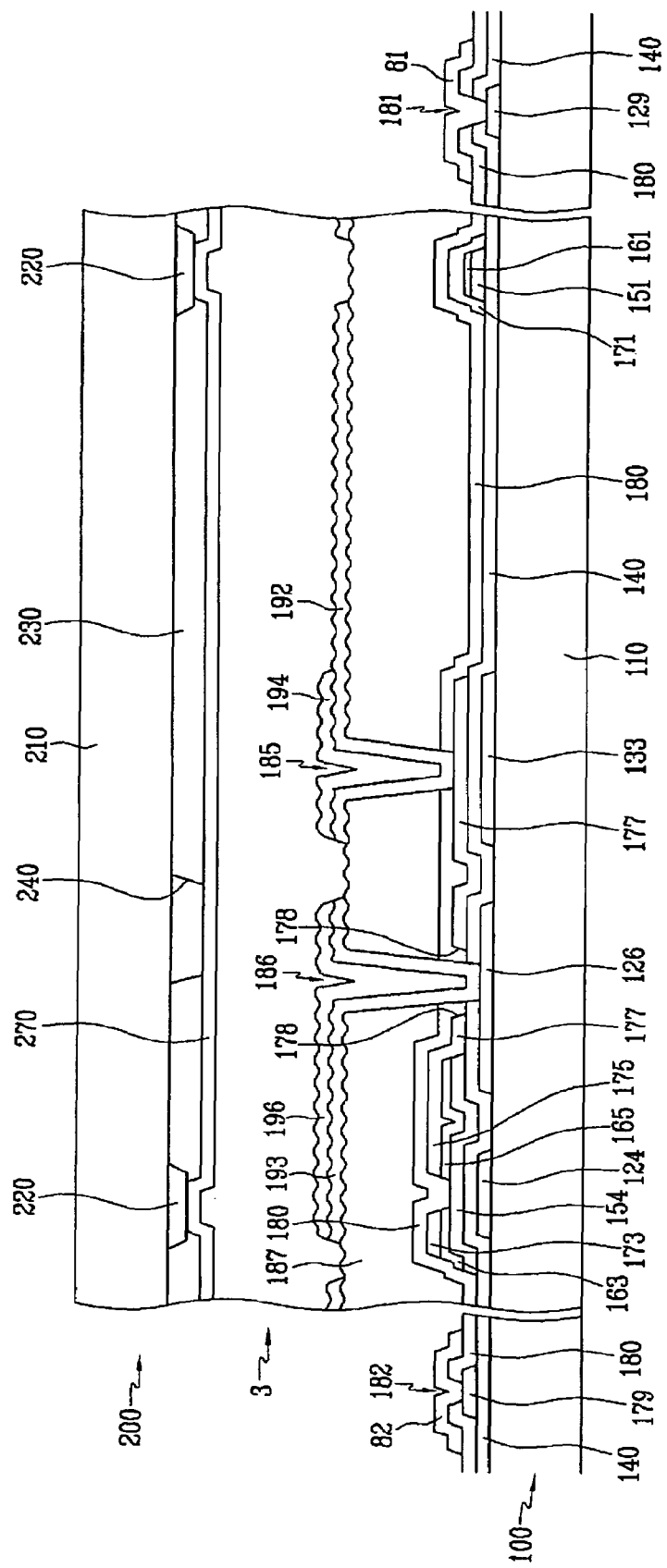
FIG. 8 is a sectional view taken along the line VIII-VIII' of FIG. 7.

Henceforth, a structure of an LCD according to an embodiment of the present invention will be described in detail. FIG. 7 is a layout view of the LCD illustrated in FIG. 4. FIG. 8 is a sectional view taken along the line VIII-VIII' of FIG. 7. The LCD has a TFT array panel 100, a common electrode panel 200 facing the TFT array panel 100, and a liquid crystal layer 3 interposed between the two panels 100 and 200 and having LC molecules aligned in parallel or perpendicular to the two panels 100 and 200.

Referring to FIGS. 7 and 8, a plurality of gate lines 121, storage electrode lines 131, and auxiliary electrodes 126 are formed on an insulating substrate 110. The gate lines 121 are extended in the horizontal direction and transmitting gate signals. A plurality of gate electrodes 124 are extended from the gate lines 121. An end portion 129 of the gate line 121 is expanded to form a contact with an external device such as a driving circuit.

The storage electrode lines 131 are extended in the horizontal direction and expanded at certain portions to form the storage electrodes 133. The storage electrode lines 131 are applied with a predetermined voltage such as a common voltage that is applied to a common electrode 270 of the common electrode panel 200 or a common voltage that is different from the common voltage. Each auxiliary electrode 126 is disposed between the gate line 121 and the storage electrode line 131 and separated from the gate line 121 and the storage electrode line 131 with predetermined distances.

The gate lines 121, the auxiliary electrode 126, and the storage electrode line 131 are preferably made of one of an Al based metal such as pure Al and an Al alloy, an Ag based metal such as pure Ag and an Ag alloy, a Cu based metal such as Cu and a Cu alloy, a Mo based metal such as Mo and a Mo alloy, Cr, Ti, and Ta. The gate lines 121, the auxiliary electrode 126, and the storage electrode lines 131 may be formed of two films having different physical characteristics, a lower film and an upper film. The upper film is preferably made of a low resistivity metal including Al, such as Al and Al alloy, for reducing signal delay or voltage drop in the gate lines 121, the auxiliary electrode 126, and the storage electrode lines 131. On the other hand, the lower film is preferably made of a material such as Cr, Mo, and Mo alloy such as MoW, which has good physical, chemical and electrical contact characteristics with other materials such as indium tin oxide (ITO) and indium zinc oxide (IZO). An example of combination of the lower film material and the upper film material is Cr and Al—Nd alloy. The gate lines 121, the auxiliary electrode 126, and the storage electrode lines 131 may have multi-layers more than or equal to three.

The lateral sides of the gate lines 121, the auxiliary electrode 126, and the storage electrode lines 131 may be inclined with respect to a surface of the substrate 110 at an angle ranging between about 30 degrees to about 80 degrees. A gate insulating layer 140 made of a dielectric, such as SiNx, is formed on the gate lines 121 and the storage electrode lines 131. A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 124. The semiconductor stripe 151 becomes wider at portions intersecting the gate lines 121 to cover a wide area of the gate line 121.

A plurality of ohmic contact stripes 161 and islands 165, preferably made of silicide or n+ hydrogenated a-Si heavily doped with an n type impurity, are formed on the semiconductor stripes 151. Each ohmic contact stripe 161 has a plurality of projections 163, and the projections 163 and the ohmic contact islands 165 are located in pairs on the projections 154 of the semiconductor stripes 151. The lateral sides of the semiconductors 151 and the ohmic contacts 161 and 165 are inclined with respect to a surface of the substrate 110 at an angle ranging between about 30 degrees to about 80 degrees.

A plurality of data lines 171 and a plurality of drain electrodes 175 are formed on the ohmic contacts 161 and 165 and the gate insulating layer 140. The data lines 171 for transmitting data voltages extend substantially in the longitudinal direction and intersect the gate lines 121. Each data line 171 includes an expended area 179 for contacting with another layer or an external device. Each drain electrode 175 has an expansion 177 overlapping the storage electrode 133 and the auxiliary electrode 126. The expansion 177 has an opening 178 exposing the auxiliary electrode 126.

A plurality of branches of each data line 171, which face the drain electrodes 175, form a plurality of source electrodes 173. Each pair of the source electrodes 173 and the drain electrodes 175 are separated from each other and opposite each other with respect to a gate electrode 124. The gate electrode 124, the source electrode 173, and the drain electrode 175 along with the projection 154 of the semiconductor stripe 151 form a TFT having a channel formed in the projection 154 disposed between the source electrode 173 and the drain electrode 175.

The data lines 171 and the drain electrodes 175 are preferably made of a material having high resistance against chemicals, such as Cr, Mo based metal, Ta, and Ti. The data lines 171 and the drain electrodes 175 may have a multi-layered structure including a lower film made of Mo, a Mo alloy, or Cr and an upper film located thereon and made of an Al containing metal or an Ag containing metal. Similar to the gate lines 121 and the storage electrode lines 131, the data lines 171 and the drain electrodes 175 have inclined lateral sides with respect to the surface of the substrate 110 at an angle ranging between about 30 degrees to about 80 degrees.

The ohmic contacts 161 and 165 are interposed only between the underlying semiconductors 151 and 154 and the overlying data lines 171 and drain electrodes 175 and reduce the contact resistance therebetween. The semiconductor stripes 151 has a plurality of exposed portions, which are not covered with the data lines 171 and the drain electrodes 175, such as portions located between the source electrodes 173 and the drain electrodes 175.

A passivation layer 180 made of an inorganic material, such as silicon nitride and silicon oxide, is formed on the data lines 171, the drain electrodes 175, and the exposed portions of the semiconductor stripes 151, which are not covered with the data lines 171 and the drain electrodes 175. An organic insulating layer 187 is formed on the passivation layer 180. The organic insulating layer 187 is formed from a photosensitive organic material having good planarization characteristics, and has an embossed surface. The organic insulating layer 187 is removed at on expansions 129 and 179 of the gate lines 121 and the data lines 171, thereby exposing the passivation layer 180.

The passivation layer 180 has contact holes 182 exposing the expansions 179 of the data lines 171. The passivation layer 180 and the gate insluting layer 140 have contact holes 181 exposing the expansions 129 of the gate lines 121. The passivation layer 180 and the organic insulating layer 187 have contact holes 185 exposing the expansions 177 of the drain electrodes 175. The passivation layer 180, the organic insulating layer 187, and the gate insulating layer 140 have contact holes 186 exposing the auxiliary electrodes 126. The contact holes 186 are formed through the openings 178 of the expansions 177 and are separated from the boundaries of the openings 178 with a sufficient gap therebetween. The contact holes 181, 182, 185, and 186 may have various shapes, such as polygonal or circular shape, and may have lateral surfaces inclined with respect to a surface of the substrate 110 at an angle ranging between about 30 degrees to about 85 degrees.

A plurality of transmissive electrodes 192 and 193 are formed on the organic insulating layer 187 and a plurality of first and second electrodes 194 and 196 are respectively formed on the transmissive electrodes 192 and 193. The transmissive electrodes 192 and 193 are made of a transparent conductive material, such as ITO or IZO, and the reflective electrodes 194 and 196 are made of a metal having high reflectance, such as Al, an Al alloy, Ag, or an Al alloy. The reflective electrodes 194 and 196 have embossed surfaces due to the embossed surface of the organic insulating layer 187, thereby enhancing reflective characteristics.

A contact assistant layer (not illustrated) made of Mo, a Mo alloy, Cr, Ti, or Ta may be interposed between the transmissive electrodes 192 and 193 and the reflective electrodes 194 and 196. The contact assistant layer enhances contact characteristics between the transmissive electrode 192 and 193 and the reflective electrode 194 and 196, thereby preventing the reflective electrodes 194 and 196 from being corroded due to the transmissive electrodes 192 and 193.

A pixel has a transmissive region TA and a first and second reflective regions RA1 and RA2. The transmissive region TA is a region where the first reflective electrode 194 is eliminated to expose the transmissive electrode 192. The first reflective region RA is a region where the first reflective electrode 194 is disposed, and the second reflective region RA2 is a region where the second reflective electrode 196 is disposed. The cell gap is substantially uniform in the whole region of a pixel throughout the transmissive region TA and the first and second reflective regions RA1 and RA2.

The transmissive electrodes 192 and the first reflective electrodes 194 are physically and electrically connected to the expansions 177 of the drain electrodes 175 through the contact holes 185 such that the transmissive electrodes 192 receive the data voltages from the drain electrodes 175. The transmissive electrodes 192 supplied with the data voltages generate electric fields in cooperation with the common electrode 270 of the common electrode panel 200. The electric fields reorient the liquid crystal molecules in the liquid crystal layer 3 disposed therebetween.

The transmissive LC capacitance $C_{LC0}$ is formed between the exposed transmissive electrodes 192 and the common electrode 270, and the first reflective LC capacitance $C_{LC1}$ is formed between the first reflective electrodes 194 and the common electrode 270. The storage capacitance $C_{ST}$, which stores applied voltages after turn-off of the TFT is connected in parallel to the LC capacitances $C_{LC0}$ and $C_{LC1}$. The storage capacitances $C_{ST}$ are implemented by overlapping the expansions 177 of the drain electrodes 175 with the storage electrodes 133. The storage capacitances $C_{ST}$ may be implemented by overlapping of the transmissive electrode 192 and previous gate lines 121. In this case, the storage electrode lines 131 may be omitted.

The auxiliary capacitances $C_{AUX}$ are formed by overlapping the expansions 177 of the drain electrodes 175 with the auxiliary electrodes 126 and by overlapping the expansions 177 of the drain electrodes 175 with the second reflective electrodes 196. The second reflective electrodes 196 receive voltage lower than the data voltage of the drain electrode 175 due to the auxiliary capacitances $C_{AUX}$.

The transmissive electrodes 193 and the second reflective electrodes 196 are connected to the auxiliary electrodes 126 through the contact holes 186. The second reflective electrode 196 supplied with the voltages lower than the data voltages generate electric fields in cooperation with a common electrode 270. The electric fields reorient the LC molecules in the liquid crystal layer 3 disposed therebetween.

The second reflective LC capacitances $C_{LC2}$ is formed between the second reflective electrodes 196 and the common electrode 270. The second reflective LC capacitances $C_{LC2}$ are connected with the auxiliary capacitances $C_{AUX}$ in series. Optionally, the second reflective electrodes 196 may overlap the gate lines 121 to increase a reflective ratio. Contrarily, the transmissive electrodes 192 and the first and second reflective electrodes 194 and 196 do not overlap the adjacent data lines 171 but they may overlap the adjacent data lines 171 to increase an aperture ratio and a reflective ratio.

A plurality of contact assistants 81 and 82 are formed on the passivation layer 180. The contact assistants 81 and 82 are connected to the exposed expansions 129 of the gate lines 121 and the exposed expansions 179 of the data lines 171 through the contact holes 182 and 183, respectively. The contact assistants 81 and 82 protect the expansions 129 and 179 and complement the adhesion between the expansions 129 and 179 and external devices. The contact assistants 81 and 82 are not essential components and may be formed of the same material as one of the transmissive electrodes 192 and 193 or the reflective electrodes 194 and 196.

The common electrode panel 200 facing the TFT array panel 100 includes an insulating substrate 210 formed of a transparent material such as a glass and a light blocking member 220 called as a black matrix. The light blocking member 220 prevents light leakage between the pixel electrodes and defines aperture regions corresponding to the pixel electrodes. In this invention, the pixel electrode is composed of the transmissive electrodes 192 and the reflective electrodes 194 and 196.

A plurality of color filters 230 are formed on the substrate 210 and the light blocking member 220 to fill the aperture regions defined by the light blocking member 220. The color filters 230 disposed between two adjacent data lines 171 and aligned in a column may be connected to each other to form a stripe. The color filters 230 may filter one of the three primary colors such as red, green, and blue.

Each color filter 230 has a substantially uniform thickness in the whole pixel region throughout the transmissive region TA and the first and second reflective region RA1 and RA2. The color filters 230 have light holes 240 disposed in the reflective regions RA1 and RA2. Hence, a difference in color tone between the two regions TA and RA due to number difference of transmitting the color filter 230, is compensated. As another way to compensate the difference of color tone, the thickness of the color filters 230 may be differentiated between the transmissive regions TA and the reflective regions RA1 and RA2. Fillers are formed in the light holes 240 for planarization of surfaces of the color filters 230, thereby reducing step difference due to the light holes 240. A common electrode 270 made of ITO or IZO is formed on the light blocking member 220 and the color filters 230.

Figure 9:
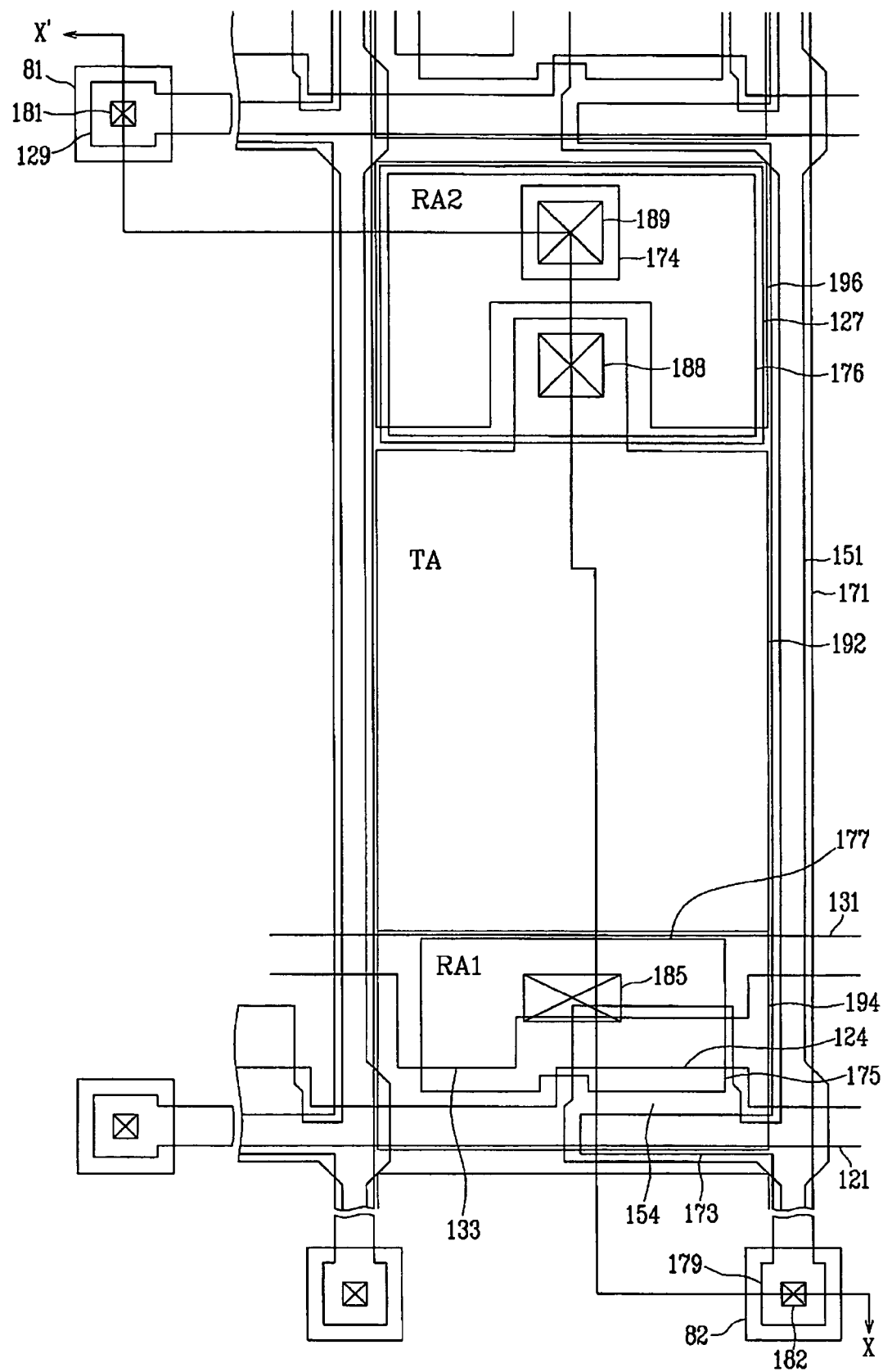
FIG. 9 is another layout view of the LCD illustrated in FIG. 4.
Figure 10:
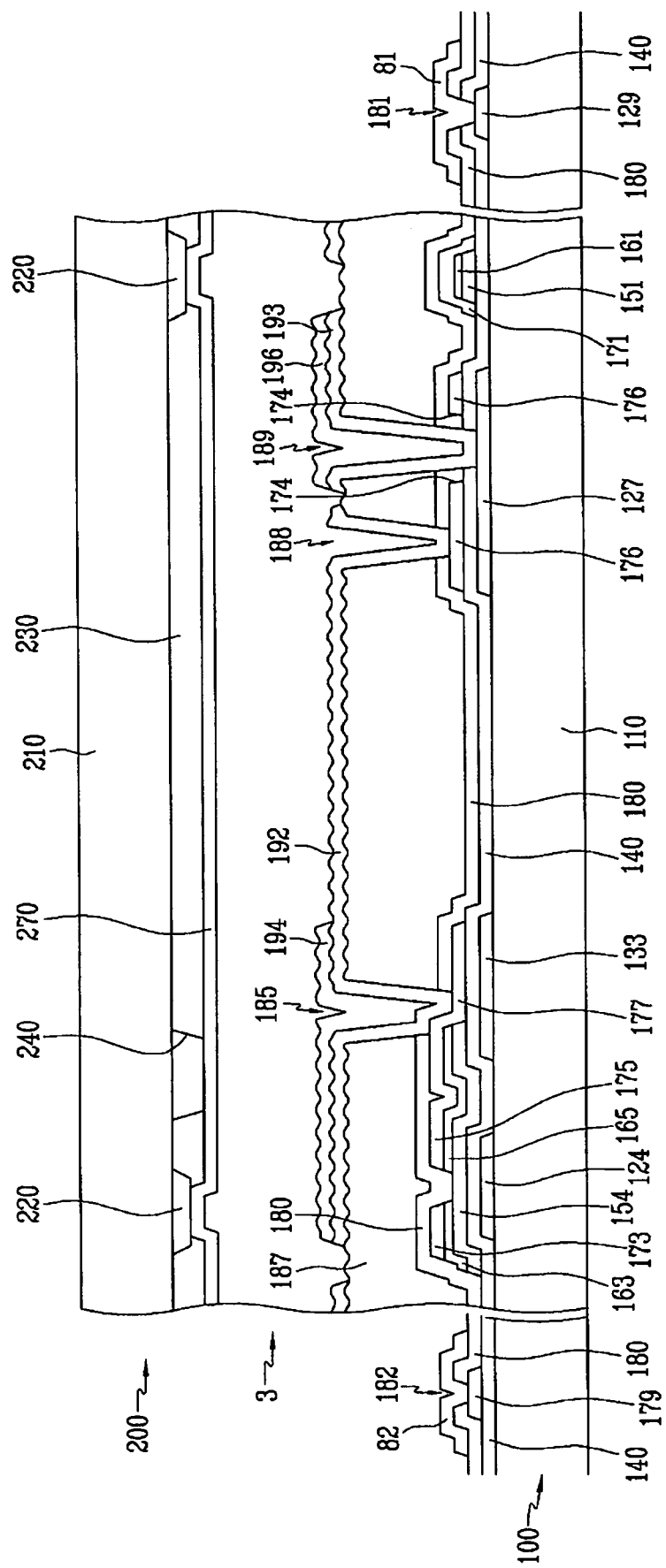
FIG. 10 is a sectional view taken along the line X-X' of FIG. 9.

An LCD according to another embodiment of the present invention will be described with reference to FIGS. 9 and 10. FIG. 9 is another layout view of the LCD illustrated in FIG. 4. FIG. 10 is a sectional view taken along the line X-X' of FIG. 9. The LCD has a TFT array panel 100, a common electrode panel 200 facing the TFT array panel 100, and a liquid crystal layer 3 interposed between the two panels 100 and 200 and having LC molecules aligned in parallel or perpendicular to the two panels 100 and 200.

The TFT array panel 100 has a plurality of gate lines 121 including gate electrodes 124, a plurality of storage electrode lines 131 including storage electrodes 133, and a first auxiliary electrode 127, which are formed on a substrate 110. The storage electrodes 133 are disposed adjacent to the gate lines 121 but are spaced apart from the first auxiliary electrodes 127. The first auxiliary electrodes 127 are disposed adjacent to the previous gate lines 121. The first auxiliary electrodes 127 are made of the same material as the gate lines 121 and storage electrode lines 131 and may have a single-layered or a multi-layered structure. A gate insulating layer 140, a plurality of semiconductor stripes 151 including protrusions 154, and a plurality of ohmic contact stripes 161 having protrusions 163 and ohmic contact island 165 are sequentially formed on the gate lines 121, first auxiliary electrodes 127, and the storage electrode lines 131.

A plurality of data lines 171 having source electrodes 173 and a plurality of drain electrodes 175 are formed on the ohmic contacts 161 and 165 and the gate insulating layer 140. A plurality of second auxiliary electrodes 176 are formed on the gate insulating layer 140, and the second auxiliary electrodes 176 have openings 174. The second auxiliary electrodes 176 are separated from the data lines 171 and the drain electrodes 175. The second auxiliary electrodes 176 have almost the same planar shape as the first auxiliary electrodes 127 and overlap the first auxiliary electrodes 127. The second auxiliary electrodes 176 are made of the same material as the data lines 171 and the drain electrodes 175 and may have a multi-layered structure.

A passivation layer 180 and an organic insulating layer 187 having an embossed surface are sequentially formed on the data lines 171, the drain electrodes 175, and the second auxiliary electrodes 176. The passivation layer has a plurality of contact holes 181 and 182. The passivation layer 180 and the organic insulating layer 187 have a plurality of contact holes 185 and 188 respectively exposing expansions 177 of the drain electrodes 175 and the second auxiliary electrodes 176. The passivation layer 180, the organic insulating layer 187, and the gate insulating layer 140 have a plurality of contact holes 189 exposing the first auxiliary electrodes 127. The contact holes 189 are formed through the openings 174 of the second auxiliary electrodes 176 and are separated from the boundaries of the openings 174 with a sufficient gap therebetween. The contact holes 181, 182, 185, 188, and 189 may have various shapes such as polygonal or circular shape and may have lateral surfaces inclined with respect to a surface of the substrate 110 at an angle ranging between about 30 to about 85 degrees.

A plurality of transmissive electrodes 192 and 193 are formed on the organic insulating layer 187 and a plurality of first and second electrodes 194 and 196 are respectively formed on the transmissive electrodes 192 and 193. A pixel has a transmissive region TA and a first and second reflective regions RA1 and RA2. The transmissive region TA is a region where the first reflective electrode 194 is eliminated to expose the transmissive electrode 192. The first reflective region RA1 is a region where the first reflective electrode 194 is disposed, and the second reflective region RA2 is a region where the second reflective electrode 196 is disposed. In this embodiment, the transmissive region TA is arranged between the first reflective region RA1 and the second reflective region RA2.

The transmissive electrodes 192 and the first reflective electrodes 194 are physically and electrically connected to the expansions 177 of the drain electrodes 175 through the contact holes 185 such that the transmissive electrodes 192 receive the data voltages from the drain electrodes 175. The exposed transmissive electrodes 192 and the common electrode 270 form a transmissive LC capacitance $C_{LC0}$ and the first reflective electrodes 194 and the common electrode 270 form a first reflective LC capacitance $C_{LC1}$, which store applied voltages after turn-off of the TFT.

The transmissive electrodes 192 have protrusions protruding toward the second reflective regions RA2. The protrusions are physically and electrically connected to the second auxiliary electrodes 176 through the contact holes 188, thereby transmitting the data voltage to the second auxiliary electrodes 176. The first auxiliary electrodes 127 overlap the second auxiliary electrodes 176 to form the auxiliary capacitances $C_{AUX}$. The first auxiliary electrodes 127 receive voltages lower than the data voltages applied to the second auxiliary electrode 176 due to the auxiliary capacitances $C_{AUX}$.

The transmissive electrodes 193 and the second reflective electrodes 196 are physically and electrically connected to the first auxiliary electrodes 127 through the contact holes 189 and receive voltages lower than the data voltages. The second reflective electrode 196 supplied with the voltages lower than the data voltages generate electric fields in cooperation with a common electrode 270. The electric fields reorient LC molecules in the liquid crystal layer 3 disposed therebetween. The second reflective electrodes 196 and the common electrode 270 form the second reflective LC capacitances $C_{LC2}$. The second reflective LC capacitances $C_{LC2}$ are connected with the auxiliary capacitances $C_{AUX}$ in series.

The common electrode panel 200 facing the TFT array panel 100 includes the insulating substrate 210 formed of a transparent material such as a glass and the light blocking member 220, a plurality of color filters 230, and the common electrode 270 formed on the insulating substrate 210. The color filters 230 have light holes 240.

In the present invention, each reflective region is divided into two sub-regions. A data voltage is applied to one of the two sub-regions and a voltage lower than the data voltage is applied to the other sub-region. Hereby, an LCD having gamma curves of the reflective mode and the transmissive mode coinciding with each other and having a substantially uniform cell gap is provided.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A thin film transistor (TFT) array panel, comprising:
a substrate;
a transmissive electrode formed in a transmissive region;
a first reflective electrode in a reflective region and connected to the transmissive electrode;
a second reflective electrode in the reflective region and separated from the transmissive electrode and the first reflective electrode;
a first conductor connected to at least one of the transmissive electrode and the first reflective electrode;
a second conductor connected to the second reflective electrode,
a first insulating layer interposed between the first and the second reflective electrodes and the first conductor,
wherein the first conductor overlaps at least one of the second reflective electrode and the second conductor so as to form capacitative coupling.

2. The TFT array panel of claim 1, further comprising a second insulating layer interposed between the transmissive electrode and the second reflective electrode.

3. The TFT array panel of claim 2, further comprising a switching element having an output electrode connected to the transmissive electrode.

4. The TFT array panel of claim 1, further comprising a third insulating layer interposed between the first conductor and the second conductor.

5. The TFT array panel of claim 1, further comprising a switching element having an output electrode connected to the first conductor, wherein the first reflective electrode is connected to the first conductor.

6. The TFT array panel of claim 5, wherein the first insulating layer and the third insulating layer have a first contact hole exposing the second conductor and the first insulating layer has a second contact hole exposing the first conductor, wherein the second reflective electrode is connected to the second conductor through the first contact hole and the first reflective electrode is connected to the first conductor through the second contact holes.

7. The TFT array panel of claim 1, wherein the first insulating layer is interposed between the first conductor and the second reflective electrode.

8. The TFT array panel of claim , further comprising a switching element having an output electrode connected to the first conductor, wherein the first reflective electrode is connected to the first conductor.

9. A liquid crystal display (LCD) comprising a plurality of pixels, each pixel comprising:
   a transmissive LC capacitance formed between a first electrode and a second electrode;
   a first reflective LC capacitance formed between the first electrode and the second electrode;
   a second reflective LC capacitance formed between the second electrode and a third electrode; and
   an auxiliary capacitance formed between the first electrode and a fourth electrode,
   wherein a voltage applied to the first reflective LC capacitance is different from that applied to the second reflective LC capacitance.

10. The LCD of claim 9, wherein the voltage applied to the first reflective LC capacitance is larger than that applied to the second reflective LC capacitance.

11. The LCD of claim 9, further comprising a storage capacitance formed between the first electrode and a fifth electrode.

12. The LCD of claim 9, further comprising a switching element having an output electrode connected to the transmissive LC capacitance, the first reflective LC capacitance and the auxiliary capacitance.

13. The LCD of claim 12, wherein the transmissive LC capacitance and the first reflective LC capacitance receive a data voltage from the switching element, and the second reflective LC capacitance receives a voltage smaller than the data voltage via the auxiliary capacitance.

14. The LCD of claim 12, wherein the first electrode is connected to the switching element and comprises a transmissive electrode and a first reflective electrode, the third electrode is a second reflective electrode separated from the transmissive electrode and the first reflective electrode, and the fourth electrode is an auxiliary electrode connected to the second reflective electrode.

15. The LCD of claim 14, wherein the auxiliary capacitance is formed by overlapping at least one of the transmissive electrode, the first reflective electrode and the output electrode of the switching element with at least one of the second reflective electrode and the auxiliary electrode.

16. The LCD of claim 15, wherein the second electrode is a common electrode receiving a reference voltage.

* * * * *